UNITED STATES PATENT OFFICE.

FREDERICK WEBSTER, OF BROOKLYN, NEW YORK.

IMPROVEMENT IN WOOD-FINISHING COMPOUNDS OR OILS.

Specification forming part of Letters Patent No. 138,109, dated April 22, 1873; application filed March 29, 1873.

*To all whom it may concern:*

Be it known that I, FREDERICK WEBSTER, of Brooklyn, in the county of Kings and State of New York, have invented a new and useful Improvement in Finishing-Oil, of which the following is a specification:

My invention has for its object to furnish an improved oil designed more especially for black walnut, real or imitation, but applicable to other woods, which, when applied to new work, brings out the natural colors, removes the roughness, and gives a smooth finish, and which, when applied to old work, restores its colors to their former brightness. The invention consists in an improved finishing-oil, prepared of the ingredients in the proportions and manner substantially as hereinafter set forth.

In preparing my improved oil I take two gallons of raw linseed-oil and mix with it three quarts of boiled linseed-oil, two quarts of spirits of turpentine, and three quarts of a liquid paint-drier. (C. T. Reynolds and Co's. strong paint-drier is preferred.) A half pound of bees-wax cut into small pieces is then put into the mixture. The mixture is then thoroughly stirred, poured all at once or a part at a time into some suitable vessel and heated sufficiently to wholly melt the wax.

The oil is now ready for use and may be applied with a brush. When applied to solid walnut it should be allowed to stand twenty minutes and then rubbed in with a woolen cloth in the ordinary way. When applied to imitation walnut it is applied with a brush, and should not be rubbed.

Having thus described my invention, I claim as new and desire to secure by Letters Patent—

An improved finishing-oil, prepared of the ingredients in the proportion and manner substantially as herein set forth.

FREDERICK WEBSTER.

Witnesses:
    JAMES T. GRAHAM,
    T. B. MOSHER.